United States Patent
Riman et al.

(10) Patent No.: US 12,285,797 B2
(45) Date of Patent: Apr. 29, 2025

(54) CASTING ELEMENTS AND METHODS OF MAKING THE SAME USING LOW TEMPERATURE SOLIDIFICATION

(71) Applicant: Rutgers, The State University of New Jersey, New Brunswick, NJ (US)

(72) Inventors: Richard E. Riman, Piscataway, NJ (US); Kevin Blinn, Franklin Park, NJ (US)

(73) Assignee: RUTGERS, THE STATE UNIVERSITY OF NEW JERSEY, New Brunswick, NJ (US)

( * ) Notice: Subject to any disclaimer, the term of this patent is extended or adjusted under 35 U.S.C. 154(b) by 148 days.

(21) Appl. No.: 17/757,950

(22) PCT Filed: Dec. 24, 2020

(86) PCT No.: PCT/US2020/067035
§ 371 (c)(1),
(2) Date: Jun. 24, 2022

(87) PCT Pub. No.: WO2021/134025
PCT Pub. Date: Jul. 1, 2021

(65) Prior Publication Data
US 2023/0036173 A1 Feb. 2, 2023

Related U.S. Application Data

(60) Provisional application No. 62/953,360, filed on Dec. 24, 2019.

(51) Int. Cl.
| | |
|---|---|
| *B22C 1/12* | (2006.01) |
| *B22C 1/14* | (2006.01) |
| *B22C 1/16* | (2006.01) |
| *B22C 1/18* | (2006.01) |
| *B22C 3/00* | (2006.01) |
| *B22C 9/04* | (2006.01) |
| *B22C 9/06* | (2006.01) |
| *B22C 9/12* | (2006.01) |

(52) U.S. Cl.
CPC .................. *B22C 1/12* (2013.01); *B22C 1/14* (2013.01); *B22C 1/162* (2013.01); *B22C 1/18* (2013.01); *B22C 1/181* (2013.01); *B22C 1/183* (2013.01); *B22C 1/185* (2013.01); *B22C 3/00* (2013.01); *B22C 9/04* (2013.01); *B22C 9/061* (2013.01); *B22C 9/123* (2013.01)

(58) Field of Classification Search
CPC .... B22C 1/12; B22C 1/14; B22C 1/16; B22C 1/162; B22C 1/18; B22C 1/181; B22C 1/183; B22C 1/185; B22C 3/00; B22C 9/04; B22C 9/12; B22C 9/123
USPC .............................. 164/518, 520, 525, 528
See application file for complete search history.

(56) References Cited

U.S. PATENT DOCUMENTS

| | | |
|---|---|---|
| 3,585,058 A | 6/1971 | Reardon |
| 4,209,056 A | 6/1980 | Gardikes et al. |
| 4,226,626 A | 10/1980 | Toeniskoetter et al. |
| 5,900,382 A | 5/1999 | Shaw |
| 6,200,381 B1 | 3/2001 | Rechichi |
| 6,284,688 B1 | 9/2001 | Trinkl et al. |
| 9,539,637 B2 | 1/2017 | McGuire et al. |
| 2010/0247700 A1 | 9/2010 | Hayashi et al. |
| 2014/0272216 A1 | 9/2014 | Deo et al. |
| 2015/0266778 A1 | 9/2015 | Riman et al. |
| 2016/0244968 A1 | 8/2016 | Zambrzycki et al. |
| 2017/0011820 A1 | 1/2017 | Yin et al. |

FOREIGN PATENT DOCUMENTS

| | | |
|---|---|---|
| CN | 101 139 182 A | 3/2008 |
| CN | 104944975 A | 9/2015 |
| GB | 800143 A | 8/1958 |
| JP | S63115646 A | 5/1988 |
| JP | 2010227977 A | 10/2010 |
| JP | 201655318 A | 4/2016 |
| JP | 2018520887 A | 8/2018 |
| WO | 2014/159832 A1 | 10/2014 |
| WO | 2018/175769 A1 | 9/2018 |

*Primary Examiner* — Kevin P Kerns
(74) *Attorney, Agent, or Firm* — FOX ROTHSCHILD LLP

(57) ABSTRACT

Foundry casting elements and methods of forming the same, the methods including: forming an aqueous slurry including an inorganic binder precursor, shaping the slurry using a pattern, curing the shaped slurry using a low temperature solidification process to form a casting element, and removing the pattern from the casting element.

12 Claims, 6 Drawing Sheets

10  12

CASTING ELEMENTS AND METHODS OF MAKING THE SAME USING LOW TEMPERATURE SOLIDIFICATION

CROSS-REFERENCE TO RELATED APPLICATIONS FIELD

This application claims the benefit of priority to U.S. Provisional Patent Application No. 62/953,360 filed Dec. 24, 2019, the disclosures of which are hereby incorporated by reference in their entireties.

FIELD

Aspects of the present invention are directed to casting elements and methods of making such casting elements using low temperature solidification.

BACKGROUND

Sand casting and investment casting processes involve shaping a particulate or granular refractory material around a pattern to form a cavity, such that molten material can be poured into the cavity to form an article having the same shape as the pattern. Once the molten material has solidified sufficiently, the desired article is removed by destroying the mold. The mold material is then discarded or recycled for reuse. The disposability of the mold makes these processes similar to others that employ ceramic materials, but contrasts it with permanent mold methods such as die casting, squeeze casting, vacuum casting, or pressure casting, although the pressure assistance aspects of those methods can be adapted in some form to sand and investment casting. Among the wide variety of casting methods available to manufacturers, sand casting is distinguished by its relatively low cost, a versatile range of materials that can be cast, and the ability to cast large objects. Sand casting is widely used among manufacturers of metallic components, accounting for greater than 100 million tons of material produced globally each year. Ferrous metals such as steel and other iron alloys as well as non-ferrous metals such as aluminum, copper, magnesium, lead, zinc, tin, nickel, titanium, noble metals, and refractory alloys can be processed using some form of sand casting. Non-metallic oxide materials such as glass can also be formed through sand casting. Investment casting is favored for its capability to produce parts with excellent surface finish and tight dimensional tolerances with minimal need for machining, while parts that are sand cast require finishing steps such as grinding and polishing. However, investment casting is costlier than sand casting primarily because of cycle time.

SUMMARY

According to various embodiments, provided is a method of forming a foundry casting element, the method comprising: forming an aqueous slurry comprising a solid inorganic binder material, shaping the slurry using a pattern; curing the shaped slurry using a reactive low temperature solidification (RLTS) to form a casting element, and removing the pattern from the casting element. In some embodiments, curing occurs only after the slurry is shaped. In some embodiments, the solid inorganic binder material comprises at least one component selected from the group consisting of magnesium oxide, magnesium hydroxide, magnesium carbonate, magnesium carbonate hydrate, calcium oxide, calcium hydroxide, calcium carbonate, mono-calcium silicate, di-calcium silicate, tri-calcium silicate, calcium aluminate, calcium aluminosilicate, and a rare earth oxide, wherein the at least one component is combined with one or more of clay, colloidal silica, and one or more elements selected from the group consisting of magnesium, aluminum, iron, zinc, zirconium, titanium, vanadium, yttrium, lithium, sodium, potassium, bismuth, cerium, strontium, calcium, barium, lanthanum, copper, and boron, wherein the one or more elements are in a form of oxide, hydroxide and/or hydrous oxide. Rare earth metal includes lanthanum, cerium, praseodymium, neodymium, promethium, samarium, europium, gadolinium, terbium, dysprosium, holmium, erbium, thulium, ytterbium, lutetium, scandium, and yttrium. In some embodiments, the binder precursor comprises at least a compound of the chemical formula, $ABO_3$ wherein A is magnesium, calcium, strontium or barium, B is titanium or zirconium, $ABO_3$ is a form of line compound, solid solution or multiphase mixture $ABO_3$ compounds; wherein the method includes infiltrating the shaped slurry with $CO_2$ and at least partially converts the $ABO_3$ to a A-site metal carbonate and B-site metal dioxide. Applications of technology include for example foundry casting element for sand casting and investment casting or refractory element for refractory-bricks, -castable, -gunning and -ramming mixes.

According to various embodiments, provided is a method of forming a foundry casting element, the method comprising forming an aqueous first slurry comprising a refractory sand and a binding polymer; forming an aqueous second slurry comprising solid inorganic binder material and a thermoreversible additive; applying the first slurry to a pattern to form a first coating; heating the second slurry to a temperature ranging from about 50° C. to about 100° C.; dipping the pattern into the heated second slurry to form a second coating on the first coating; gelating the second coating by allowing the second coating to cool to a temperature below about 50° C.; and infiltrating the first and second coatings with CO2 to cure the first and second coatings and form a casting element. In some embodiments, the dipping and the gelating are performed at least twice to form a three-layer structure. In some embodiments, the refractory sand comprises a zircon sand; wherein the method further comprises applying additional zircon sand to the first coating; and the solid inorganic binder material comprises at least one component selected from the group consisting of magnesium oxide, magnesium hydroxide, calcium oxide, calcium hydroxide, mono-calcium silicate, di-calcium silicate, tri-calcium silicate, calcium aluminate, calcium aluminosilicate, and a rare earth oxide.

According to various embodiments, provided is a foundry casting element comprising a mixture of a refractory sand and magnesium aluminum phosphate gel admixed with one or more components. In some embodiments, the binder includes an $MgO-Al_2O_3-Fe_2O_3-P_2O_5-H_2O$ gel. Optional additional components include for example clay, fumed silica and a soluble precursor of zinc or a rare earth lanthanide ion. In some embodiments, the refractory sand comprises a silica sand, an olivine sand, a chromate sand, a zircon sand, a chamotte sand, aluminosilicate sand, or any combinations thereof, and wherein the casting element comprises a sand casting mold, a sand casting mold core, an investment casting shell, or a refractory mix, wherein the refractory mix is a brick, castable, gunning or ramming mix.

According to various embodiments a refractory brick for a molten metal holding ladle comprises larger MgO particles bonded to each other by smaller magnesium carbonate particles. Also provided is a molten metal holding ladle or blast furnace having an inner surface lined with the refractory bricks disclosed herein.

According to various embodiments a method of forming a foundry casting element comprises forming an aqueous slurry comprising a solid inorganic oxide material, and infiltrating the slurry with $CO_2$ to at least partially convert the solid inorganic oxide material to a solid inorganic carbonate material and to form the foundry casting element. the solid inorganic oxide material comprises $CaSiO_3$, and the infiltrating the slurry with $CO_2$ at least partially converts the $CaSiO_3$ to a calcium carbonate in a sand mold foundry casting element. the solid inorganic oxide material comprises MgO; the infiltrating the shaped slurry with $CO_2$ partially converts the MgO to magnesium carbonate to form a refractory element for bricks, castable, gunning or ramming mixes. The method can be used for metallurgical purposes in general, including for example blast furnaces and ladles.

DETAILED DESCRIPTION

Figure 1A:
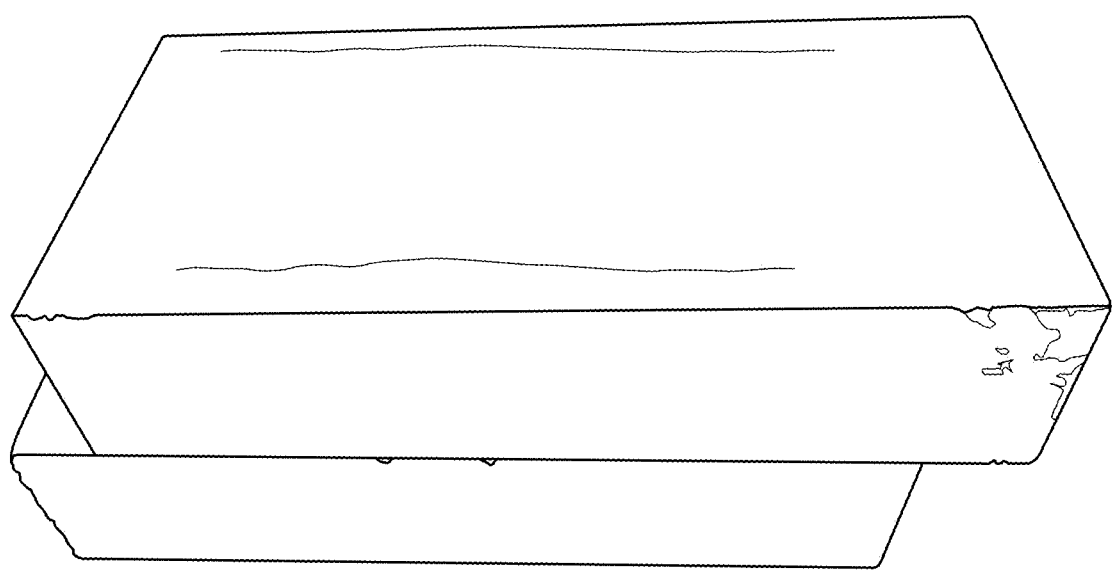
FIGS. 1A and 1B are photographs of refractory bricks, according to various embodiments of the present disclosure.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

Herein, a "foundry casting element" or a "casting element" may refer to casting bricks made of a refractory material and usable for lining ladles used in metallurgy processes, such as in metal casting, and/or it may refer to casting molds, casting cores, or the like, made of a refractory material and used for sand casting, investment casting or the like. Ranges can be expressed herein as from "about" one particular value, and/or to "about" another particular value. When such a range is expressed, examples include from the one particular value and/or to the other particular value. Similarly, when values are expressed as approximations, by use of the antecedent "about" or "substantially" it will be understood that the particular value forms another aspect. In some embodiments, a value of "about X" may include values of +/−1% X. It will be further understood that the endpoints of each of the ranges are significant both in relation to the other endpoint, and independently of the other endpoint.

It will be apparent to those skilled in the art that various modifications and variations can be made to the present disclosure without departing from the spirit and scope of the disclosure. Since modifications combinations, sub-combinations and variations of the disclosed embodiments incorporating the spirit and substance of the disclosure may occur to persons skilled in the art, the disclosure should be construed to include everything within the scope of the appended claims and their equivalents.

The composition of a sand casting material generally includes a particulate or granular refractory material and a binder as major components. The refractory material generally makes up a vast majority of the mass used in sand casting elements, such as sand casting molds or cores. The refractory material may include a silica sand, an olivine sand, a chromite sand, a zircon sand, a chamotte sand, or any combination thereof. The sand that is chosen for a casting element depends on the chemistry of the material to be cast as well as cost considerations. The binder, on the other hand, is used to coat and bond the refractory particles together. The nature of the binder may distinguish various types of sand casting materials and/or methods from one another. For example, a green sand mold is a commonly used type of sand casting mold that includes a combination of bentonite clay, water, and other additives most often serves as the binder.

Green sand molds are inexpensive and allow for a wide range of mold properties, although tight tolerances and high aspect ratio features in cast articles are much less feasible than other sand casting methods. Further, green sand casting generally does not enable the effective production of high-quality sand cores, which are used to produce hollow cavities in the castings themselves. Sand molds and cores having more stringent property requirements are more often produced using other sand casting methods such as airset/nobake, coldbox, and shell/hotbox methods. In these methods, sands are coated with an organic or inorganic resin that chemically bonds the particles following a catalyzed curing process.

In sand casting, many of the state-of-the-art methods for chemical bonding of sands used in casting molds share several advantages including fast processing times, dimensional stability for molds, and the ability to produce excellent surface finishes, as well as high aspect ratio features in the final casts. However, unlike green sand, binder components are far more expensive than clay and water. Timing is also critical when working with certain organic and inorganic resins, since curing begins as soon as the components are mixed, meaning that working time for forming the mold is short. In addition, curing continues even after the mold and pattern are separated, so casting into a mold requires a rapid pouring time, in order to insure that the mold has a strength and permeability within a specified range.

If a mold is left to cure for too long, mold knockoff is more difficult and could damage the cast part. Further, curing processes for commonly used organic resins, such as pitch, can emit vapors that are harmful to foundry workers and the environment, and the thermal decomposition of these resins during casting releases another round of harmful vapors. Such vapors can also create defects in the cast articles.

While inorganic binders such as sodium silicate systems do not share this disadvantage, the performance of sand molds and cores with sodium silicate-based binders is extremely sensitive to humidity, which is difficult to control particularly in a foundry environment, in addition having longer curing times. Finally, resin-bound sands are recyclable using an energy-intensive thermal reclamation process. The energy expense adds to the cost of using them for sand casting operations.

Investment casting utilizes molds that include a shell formed from sintered intermixed coarse and fine refractory material(s). In a typical mold-making process, a wax pattern in the shape of the desired object is first dipped into a slurry containing fine refractory flour, after which the wet slurry-coated pattern is stuccoed with coarse refractory sand. The coated pattern is then dried for an appropriate amount of time, which is typically several hours. The coating and drying steps are then repeated until a desired coating thickness is achieved. The coated pattern is then autoclaved to remove the wax pattern, leaving behind the refractory shell mold. The coating slurry usually contains a binder to provide the mold with sufficient green strength to withstand this process. After autoclaving, the mold is heated to high temperature prior to pouring molten material into it. The material is sometimes engineered to possess its highest strength at this elevated temperature.

The main disadvantage that is inherent to investment casting is a lack of speed. The lengthy drying cycles between coatings can make the fabrication of a single mold take several days to several weeks to complete. In addition, continuous dipping processes render mold strengthening via self-setting binders a heavy technical challenge, since the dipping slurry needs to have a long "bench life." Further, fused silica, which is a common component in the refractory shell, can crystallize during the heating step, and the resulting crystalline silica presents a hazard during shell knock-out.

Exemplary Mold and Core Casting Materials and Methods

According to various embodiments of the present disclosure, novel foundry casting materials and processing methods are provided that overcome the above and/or other disadvantages of conventional foundry casting elements and methods. Various embodiments provide methods of creating foundry casting elements that are relatively low cost and have high process flexibility, desirable speed, ease of recyclability, and premium casting performance attributes.

According to various embodiments of the present disclosure, a binder material for foundry casting elements includes a solid inorganic binder material as a primary component (e.g., the solid inorganic binder material comprises greater than 50 atomic percent of the entire binder material, such as 80 to 100 atomic percent of the binder material). In some embodiments, the solid inorganic binder material may be formed from a ceramic powder and/or metal oxide ceramic precursor material, such as calcium silicate ($CaSiO_3$), titanium dioxide ($TiO_2$), zirconium dioxide ($ZrO_2$), yttria-stabilized zirconia, lanthanum oxide ($La_2O_3$), magnesium oxide (MgO), iron oxide ($Fe_2O_3$), calcium oxide (CaO), combinations thereof, or the like, and/or metal powders, such as iron and/or magnesium powders which comprise a ceramic precursor material. In exemplary embodiments, an individual inorganic binder or binder precursor may be present ranging from about 5% to about 100%, from about 15% to about 90%, from about 25% to about 90%, from about 40% to about 90%, from about 50% to about 90%, from about 60% to about 90%, or from about from about 80% to about 100% by weight in the overall binder. In some more exemplary embodiments, the binder material ranges from about 1% to about 95%, from about 5% to about 80%, from about 5% to about 60%, from about 5% to about 40%, from about 5% to about 20%, from about 10% to about 60%, from about 10% to about 40%, or from about 10% to about 20% by weight in the casting element. In further exemplary embodiments, the weight ratio between refractory material (e.g. refractory sand) and one or more of the binder materials in the casting element ranges from about 1000:1 to about 1:10, from about 200:1 to about 1:1, from about 200:1 to about 10:1, from about 100:1 to about 10:1, or from about 100:1 to about 50:1.

Through curing or a similar process, this solid inorganic binder material operates as a bonding element (i.e., as a binder or bonding material) that joins the refractory material particulates. In some embodiments, the refractory material may have a larger particle size than that of the solid inorganic binder material of the bonding element. The bonding element can contain both crystalline and amorphous phases.

For example, according to various embodiments of the present disclosure, in a sand mold-making process particles of the solid inorganic binder material are thoroughly mixed with refractory sand using a muller, intensive mixer, blade mixer, or other mixing process. Water, clay, and other additives may be added to this mixture to, for example, to form a homogeneous mixture or non-setting slurry having a viscosity suitable for shaping. Herein, a "non-setting slurry" may refer to a slurry in which solids remain homogeneously mixed in suspension, for long periods of time (e.g., for time periods of at least an hour, such as at least a day, or at least several days or weeks).

The mixture is then formed into a foundry casting element, such as a mold or core, using a pattern and/or an appropriate patterning method, such as slinging, jolting, squeezing, ramming, vibrocasting, or blowing. The solid inorganic binder material is then subjected to a curing process, as discussed below. The foundry casting element is separated from the pattern once the foundry casting element is cured to sufficient strength to maintain structural integrity. If the foundry casting element is strong enough to be removed from the pattern without curing, the curing reaction may be initiated after removal from the pattern. Curing and drying of the foundry casting element, if applicable, may be continued until it is ready to be used in a casting process. In some embodiments, the solid inorganic binder material comprises at least one of $CaSiO_3$, MgO, or CaO. In some embodiments, the solid inorganic binder material comprises $CaSiO_3$ and at least one of MgO and CaO. In some embodiments, the curing includes infiltrating the shaped slurry with $CO_2$ at a temperature ranging from about 20° C. to about 200° C., from about 20° C. to about 100° C., from about 20° C. to about 80° C., from about 30° C. to about 80° C., from about 40° C. to about 60° C., from about 40° C. to about 50° C., or from about 50° C. to about 70° C. and at a pressure ranging from about 20 psig to about 100 psig, from about 30 psig to about 80 psig, from about 40 psig to about 80 psig, from about 50 psig to about 80 psig, or from about 50 psig to about 70 psig.

According to various other embodiments of the present disclosure, in an investment casting process the solid inorganic binder material is mixed with the refractory material (e.g., refractory sand) and water using an intensive mixer, blade mixer, or other mixing process, to form a slurry that is used to coat a wax (or similar material) casting pattern. Additives such as dispersants and gums are incorporated into the resulting slurry to modify the rheology in order to achieve a desired coating thickness during a subsequent dip-coating step or steps of the process.

In various embodiments of the present invention, the slurry may be optionally heated and a set of additives may be incorporated into the heated slurry to form a thermoreversible slurry (e.g., sol-gel) in which the solid inorganic binder material particles and refractory material particles are dispersed. Such additives may include, but are not limited to, carrageenans, potassium chloride, calcium chloride, agarose, and hydroxymethyl cellulose. The slurry may be heated to a temperature ranging from about 50° C. to about 100° C., such as from about 60° C. to about 90° C., or from about 65° C. to about 85° C.

A pattern made of wax, plastic, or similar dissolvable material may then be dipped into the slurry, such that a uniform coating of slurry of desired thickness is formed on the pattern. The slurry may form a gel upon cooling after removal of the pattern from the slurry. Vibration and/or heat may be applied to the slurry to decrease its viscosity during the dipping action, while allowing for fast thickening of the coating once the pattern has been withdrawn from the slurry. In some embodiments, the dip coating may be repeated multiple times. However, in contrast to conventional investment casting processes, the present inventors found that the disclosed slurry compositions may unexpectedly form a sufficiently thick and/or strong coating using after performing the dip coating process only one or two times. Meanwhile, the coating process can be completed within 3 hours, within 2 hours, within 1 hour, within 45 minutes, within 30 minutes, within 20 minutes or within 10 minutes.

Once dip coating is complete, the coated pattern is then subjected to a curing process that strengthens the inorganic binder component. Once the curing process is completed, the pattern is removed from the resulting shell, after which it may optionally be soaked at high temperature. Finally, molten material is poured into the shell to form the desired object.

One preferred form of curing for the solid inorganic binder of the above molds and/or cores is based on a reactive low temperature solidification (RLTS), which was first invented at by Atakan and Riman at Rutgers University in the form of a process called reactive hydrothermal liquid phase densification (rHLPD) (see U.S. Pat. Nos. 8,313,802 and 8,709,960, which are incorporated herein by reference in their entirety). The general rHLPD process begins with a porous matrix of material with interconnected pores. The porous network is infiltrated with a liquid that includes a solvent and soluble reactive cations and/or anions. Since the fluid wets the solid, the infiltration is spontaneous and driven by capillary forces. Subsequently, a thermodynamically favored, kinetically labile hydrothermal reaction is initiated to partially dissolve the porous matrix and form reaction products that fill the matrix pore space. Sufficiently rapid hydrothermal reaction kinetics allow this process to proceed at a temperature of less than 500° C., such as less than about 250° C. For example, this process may occur at relatively low temperatures on the order of 25-300° C., such as from about 25° C. to 200° C., including 80° C. to 180° C., which are far below those employed for most conventional densification processes. The reaction pressure may be less than 100,000 psi, such as 1 to 3 atmospheres.

By choosing a reaction product that has a larger molar volume than that of the reactive matrix, the hydrothermal reaction front moves within and fills the matrix pore space, thereby densifying and strengthening the matrix. Crystals that grow in the pores may form at the expense of the reactive matrix, but the molar volume increase more than compensates for the volumetric loss of the matrix. Under the appropriate reaction conditions, the pore space acts as a template to confine the crystal growth of the reaction product. In this case, product crystals can nucleate homogeneously in the pores, and may epitaxially grow from other product crystals, or may grow on the matrix interface. Under the appropriate reaction conditions, the pores act as a template to confine the crystal growth, such that particle centers do not move. Thus, the matrix exhibits substantially no volumetric shrinkage during curing.

In the context of the embodiments of the present invention, the intermixed solid inorganic particles and/or refractory material particles form the porous matrix that is strengthened by RLTS. The liquid component may be an aqueous solution containing species that react with the solid inorganic binder material particles and/or the main refractory material. RLTS is compatible with a multitude of different starting materials, such as ceramic, metal, cermet, other composite materials, or precursors thereof. One such material is found to be mono calcium silicate ($CaSiO_3$). However, conventionally, $CaSiO_3$ was not considered to be a suitable binder material for casting elements, due at least in part to having a significantly lower melting temperature than commonly cast metals such as steel.

Volume-filling and bonding mechanism can be applied to the preparation of various types of casing elements. For example, the volume-filling and bonding mechanism could be the formation of brushite ($CaHPO_4 \cdot 2H_2O$) and silica ($SiO_2$) from the reaction of an aqueous solution of phosphoric acid ($H_3PO_4$) with the intermixed $CaSiO_3$. The reaction can be represented by the following Equation 1:

$$CaSiO_3(s) + H_3PO_4(aq) + H_2O \rightarrow CaHPO_4 \cdot 2H_2O(s) + SiO_2(s). \quad (1)$$

Complete conversion of the $CaSiO_3$ to $CaHPO_4 \cdot 2H_2O$ and $SiO_2$ results in a net volume increase of nearly 300%. Other suitable multicomponent binder material may include $MgO/Al_2O_3/CaSiO_3$, $MgO/Al_2O_3/Fe_2O_3$, and $CaAl_2O_4$.

Phosphate-based curing has previously been used for bonding foundry sands, but the applications resulted in molds and cores that were prone to performance degradation over time, especially in humid environments. In addition, in prior phosphate-based and other chemically bonded sands, the curing reaction is immediately initiated at the time that all solid and liquid components have been mixed and before the mixture has been consolidated into the mold or core shape "react-and-pack", meaning the mixture has a practically finite bench life and the densest packing structure is not possible.

In contrast to the traditional react-and-pack approach, various embodiments provide a "pack-then-react" method where little or no curing takes place before the mixture is shaped into a casting element, such as a mold or core shape, giving the mixture a virtually infinite bench life and the ability to provide highly dense packing. Further, prior phosphate foundry sand binder applications did not appear to sufficiently recognize how the initial particle size and morphology of the inorganic components affect the performance and final microstructure of the material, which contains both amorphous and crystalline components. The particle size and morphology of the powder is determined by the firing and milling history of the powder.

For example, in one embodiment of the present disclosure, the "pack-then-react" method can be used for the $CaSiO_3$-phosphate system described above. In some embodiments, a mixture utilized for the pack-then-react method may include dense particles with little to no intraparticle porosity. The method may include mixing high-purity phosphoric acid with the $CaSiO_3$-refractory sand mixture, shaping the resulting mixture by packing the mixture into a pattern to form a casting element, and then curing the shaped mixture by low temperature steam infiltration. In some embodiments, the combination of high-purity phosphoric acid and $CaSiO_3$-refractory sand mixture are in suitable porosity configuration after forming the desirable shape and can be subject to curing condition with RLTS.

In an exemplary embodiment of low temperature steam infiltration, the shaped mixture may be infiltrated with pressurized steam having a temperature ranging from about 80° C. to about 200° C., such as from about 105° C. to about 140° C., from about 110° C. to about 130° C., or about 120° C. The steam may be applied for a time period sufficient to react at least 75%, such as at least 80%, 85%, 90%, 95%, 99%, or 99.9% of the inorganic binder material (e.g. converting $CaSiO_3$ to $CaHPO_4\cdot 2H_2O + SiO_2$). For example, the steam may be applied for a time period ranging from about 5 minutes to about 30 minutes, such as from about 10 minutes to about 20 minutes. Curing process involving binder material or precursor such as $La_2O_3$, $MgO/Al_2O_3/CaSiO_3$, $MgO/Al_2O_3/Fe_2O_3$, and $CaAl_2O_4$ may also undergo the above described conditions. In some embodiments, the weight ratio between one or more binder materials or precursors thereof and phosphoric acid ranges from about 10:1 to about 1:10, from about 5:1 to about 1:5, from about 5:1 to about 1:5, from about 3:1 to about 1:3, from about 5:1 to about 3:1, from about 3:1 to about 1:1, from about 1:1 to about 1:3, or from about 1:1 to about 1:5.

In another embodiment, a carbonation reaction using carbon dioxide may be used to form the casting element. For example, the volume filling mechanism may be formation of calcium carbonate ($CaCO_3$) and silica ($SiO_2$) from the reaction of $CaSiO_3$ with $CO_2$ that has been dissolved into the aqueous solution. The reaction can be represented by the following Equation 2:

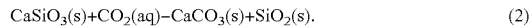

$$CaSiO_3(s) + CO_2(aq) \rightarrow CaCO_3(s) + SiO_2(s). \quad (2)$$

Complete conversion of the $CaSiO_3$ to $CaCO_3$ and $SiO_2$ results in a net volume increase of approximately 60%. In some cases, the reaction does not proceed to completion. For example, the reaction may convert from about 50% to about 99%, such as from about 60% to about 90%, or from about 70% to about 80% of the $CaSiO_3$ to calcium carbonate. Nevertheless, a partially reacted calcium silicate matrix has a unique bonding structure consisting of $CaSiO_3$ cores that are each encapsulated and bonded together by an inner layer comprised of calcium-depleted $SiO_2$ and an outer layer made of $CaCO_3$ grains.

In various embodiments, the volume filling mechanism may include the formation of magnesium carbonate ($MgCO_3$) or calcium carbonate ($CaCO_3$), by the reactions represented by the following Equations 3 and 4:

$$MgO + CO_2 \rightarrow MgCO_3; \text{ and} \quad (3)$$

$$CaO + CO_2 \rightarrow CaCO_3. \quad (4)$$

The carbonation reactions of Equations 3 and 4 using carbon dioxide may be performed in place of or in addition to the reaction of Equation 1 which uses water and phosphoric acid. In some embodiments, the $CO_2$ may be applied to a shaped material using an autoclave. In some embodiments of curing process involving the exposing the shaped material to $CO_2$, the shaped material may be held in the autoclave at a temperature ranging from about 30° C. to about 80° C., such as from about 35° C. to about 70° C., or from about 40° C. to about 50° C., and at a pressure ranging from about 40 psig to about 80 psig, such as from about 50 psig to about 70 psig, or about 60 psig. The autoclave may be held at these conditions for from about 10 hours to about 30 hours, such as about 20 hours.

Figure 1B:
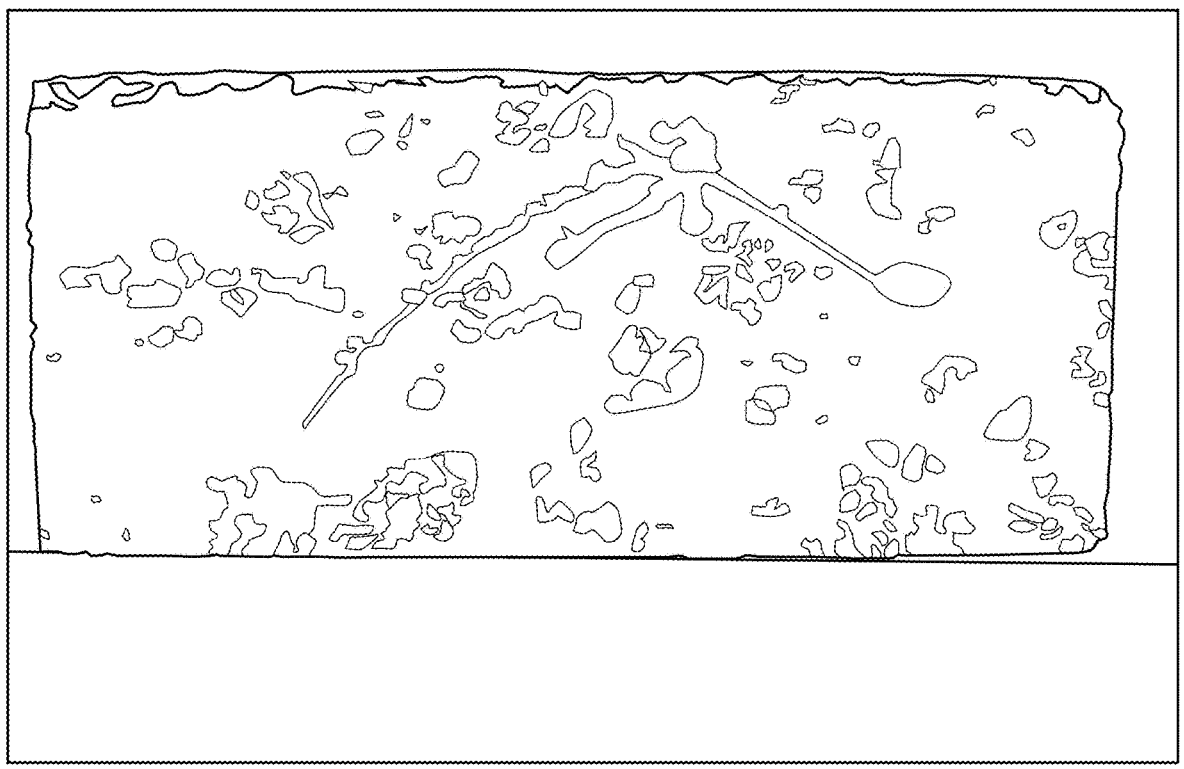
Figure 1C:
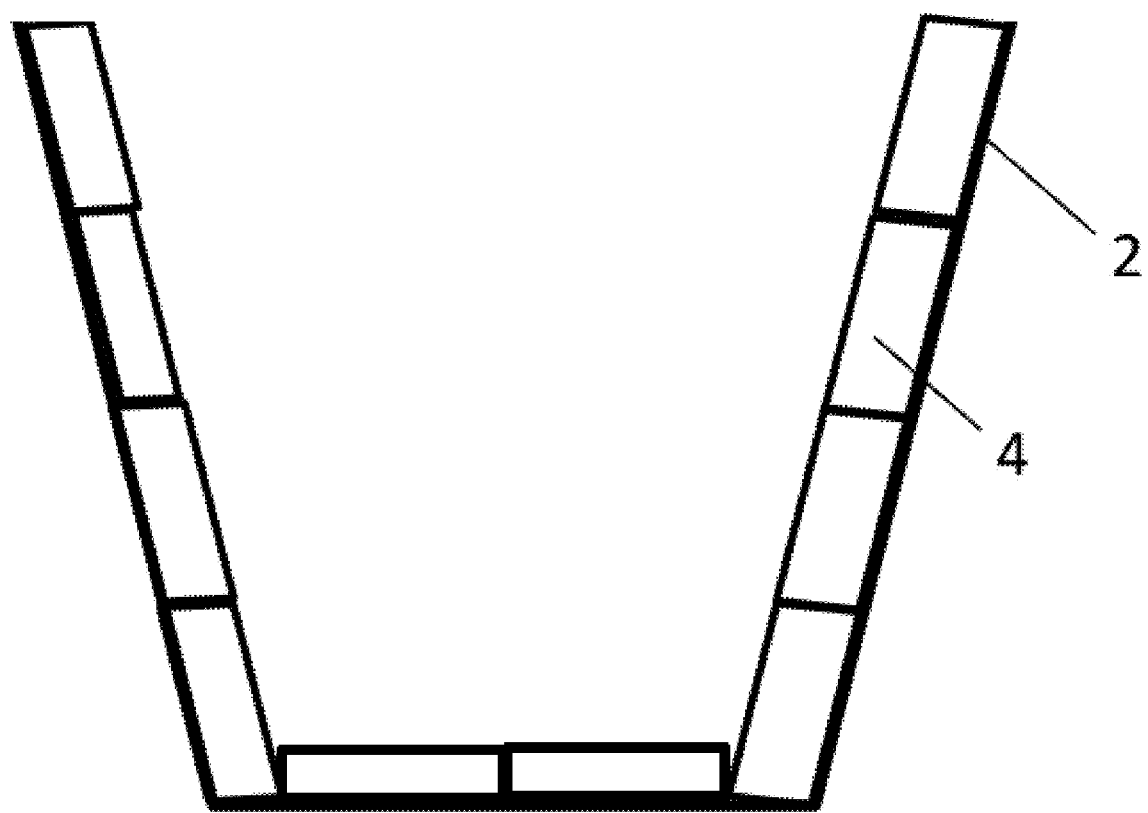
FIG. 1C is a schematic side cross-sectional view of a refractory brick lined ladle according to various embodiments of the present disclosure.

FIGS. 1A and 1B are photographs of refractory brick casting elements, according to various embodiments of the present disclosure. FIG. 1C is a schematic side cross-sectional view of a ladle 2 that is lined with the refractory bricks 4 of an embodiment of the present disclosure. The ladle 2 is filled with molten metal, such as steel, aluminum, etc., which is then poured into a mold or another location. The refractory bricks 4 protect the ladle 2 from the molten metal. For example, a refractory brick may be formed by shaping a refractory sand or powder such as MgO into a brick shape, and then infiltrating the brick shaped material with $CO_2$ to partially convert MgO to $MgCO_3$ as shown in Equation 3. For example, the $MgCO_3$ may form submicron sized particles that operate to bind together centimeter-sized particles of MgO in the refractory brick 4. In other words, the smaller magnesium carbonate particles act as a binder for larger magnesium oxide particles in the refractory brick 4. Such refractory brick 4 may consist essentially of magnesium oxide and magnesium carbonate, and exclude intentionally added organic materials, such as pitch which is used in prior art refractory bricks and creates toxic vapors.

The refractory bricks 4 may be used to line metallurgy ladles 2 and/or furnaces. In use, it is believed that the high temperatures of the molten metal may partially decompose the smaller $MgCO_3$ "binder" particles, thereby generating $CO_2$ and smaller MgO particles that may operate to sinter together (e.g., bind) the original larger MgO particles in the refractory brick 4.

In another embodiment, the volume filling mechanism of a casting element may be the formation of an MgO—$Al_2O_3$—$Fe_2O_3$—$P_2O_5$—$H_2O$ gel by the curing of a magnesium oxide (MgO), iron oxide ($Fe_2O_3$), aluminum phosphate ($H_3PO_4$) material dissolved in an aqueous solution. The reaction can be represented by the following Equation 5:

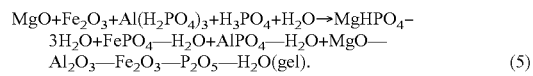

$$MgO + Fe_2O_3 + Al(H_2PO_4)_3 + H_3PO_4 + H_2O \rightarrow MgHPO_4 \cdot 3H_2O + FePO_4 \cdot H_2O + AlPO_4 \cdot H_2O + MgO—Al_2O_3—Fe_2O_3—P_2O_5—H_2O(\text{gel}). \quad (5)$$

For example, in some embodiments, a casting element may be formed by mixing from about 2000 g to about 2500 g, such as from about 2100 g to about 2300 g, or about 2200 g of a refractory sand, such as silica sand, with from about 50 g to about 100 g, such as from about 60 g to about 90 g, or about 75 g of an aqueous solution including $Al(H_2PO_4)_3$, $H_3PO_4$, and $H_2O$, to form a mixture. In some embodiments, the aqueous solution may include from about 35 wt % to about 55 wt %, such as from about 40 wt % to about 50 wt % of $Al(H_2PO_4)_3$, from about 22 wt % to about 42 wt %, such as from about 18 wt % to about 28 wt % of $H_3PO_4$, and from about 22 wt % to about 42 wt %, such as from about 27 wt % to about 37 wt % of $H_2O$. From about 20 g to about 40 g, such as from about 25 g to about 35 g of a powder including MgO and $Fe_2O_3$ may be added to the mixture to form a slurry. The powder may include from about 80 wt % to about 99 wt %, such as from about 85 wt % to about 95 wt % of MgO, and from about 1 wt % to about 20 wt %, such as from about 5 wt % to about 15 wt % of $Fe_2O_3$. The slurry may be shaped into a casting element by, for example, packing the slurry into a pattern. The shaped slurry may be held in the pattern for a time period ranging from about one hour to about 24 hours, in order form a cured casting element, such as a bonded sand core material.

Metals such as super alloys (e.g., nickel based alloys such as INCONEL, etc.), Ti alloys, noble metals, and refractory metals may present a large technical challenge for sand casting, due to their high melting temperatures and potential for adverse mold-metal interactions, such as in the case of state-of-the-art chemically bonded sands. On the other hand, aspects of the current invention encompass chemistries for producing bonding phases that are highly refractory and provide resistance to the harsh environments presented by such metals. Example chemistries include the following Equations 6-8:

$$ZrO_2(s)+Sr(OH)_2(aq)-SrZrO_3(s)+H_2O; \quad (6)$$

$$TiO_2(s)+Ba(OH)_2(aq)-BaTiO_3(s)+H_2O; \text{ and} \quad (7)$$

$$La_2O_3(s)+2H_3PO_4(aq)-2LaPO_4(s)-H_2O+2H_2O. \quad (8)$$

$SrTiO_3$ can be similarly formed from $TiO_2(s)$ and $Sr(OH)_2$. The precursors for these chemistries can be mixed into the sand or other refractory material with no curing occurring until the proper temperature is applied to the system. Such chemistries could also be incorporated to make robust metal-ceramic or ceramic-ceramic composites that are usable for making more durable molds and cores for applications such as die casting.

In some embodiments of any of the methods disclosed herein, an inert component that is stable at high temperature and does not react with the binder material can be included. The resulting casting or refractory element incorporating the inert material can thus exhibit various properties as needed. Non-limiting examples of inert material or component include oxide sands, diamond, graphite, carbon black, graphene, graphene oxide, metal carbides, silicon carbide, boron carbide, tungsten carbide, niobium carbide, titanium boride, zirconium boride, zirconia, titania, alumina, olivine, diopside, garnet, spinel, quartz, cristobalite, tridymite, calcium carbonate, and dolomite.

Example 1: Calcium Silicate-Phosphate Bonded Sand Core Material 150 g of synthetic olivine sand (AFS GFN 70) was mixed with 6 g of calcium silicate and 6 g of 85% phosphoric acid. The resulting mixture was loaded into an AFS standard 2-inch cylindrical specimen tube and rammed with a standard sand rammer. The specimen tube was connected to a steam generator and 120° C. steam can be allowed to pass through the specimen tube for 10 minutes. The bonded sand cylinder was then stripped from the specimen tube. Afterward, the cylinder was subjected to hot compressive strength and penetration tests to demonstrate that it had sufficient refractory and mechanical properties for casting applications. In some embodiments, $La_2O_3$ was substituted for some or all of the $CaSiO_3$, in order to produce a bonded sand material with higher refractory robustness.

Example 2: Calcium Silicate-Carbonate Bonded Sand Mold 15.8 kg of synthetic olivine sand (AFS GFN 70) was mixed with 1.6 kg of calcium silicate, 1.6 kg of western bentonite clay, and 1 kg of water. The mixture was rammed into a wooden mold set that incorporated a brake rotor pattern, forming a cope and a drag. The cope and the drag formed from the rammed mixture were each stripped from the patterns and placed directly into a 230 L autoclave. The autoclave was sealed, heated to 65° C., and filled with bone-dry $CO_2$ until a pressure of 60 psig was achieved. The autoclave was held at these conditions for 20 hours with a lid-mounted fan continuously rotating at 500 RPM. After 20 hours had elapsed, the autoclave was allowed to cool, the pressure is released, and the fan is turned off.

Figure 2A:
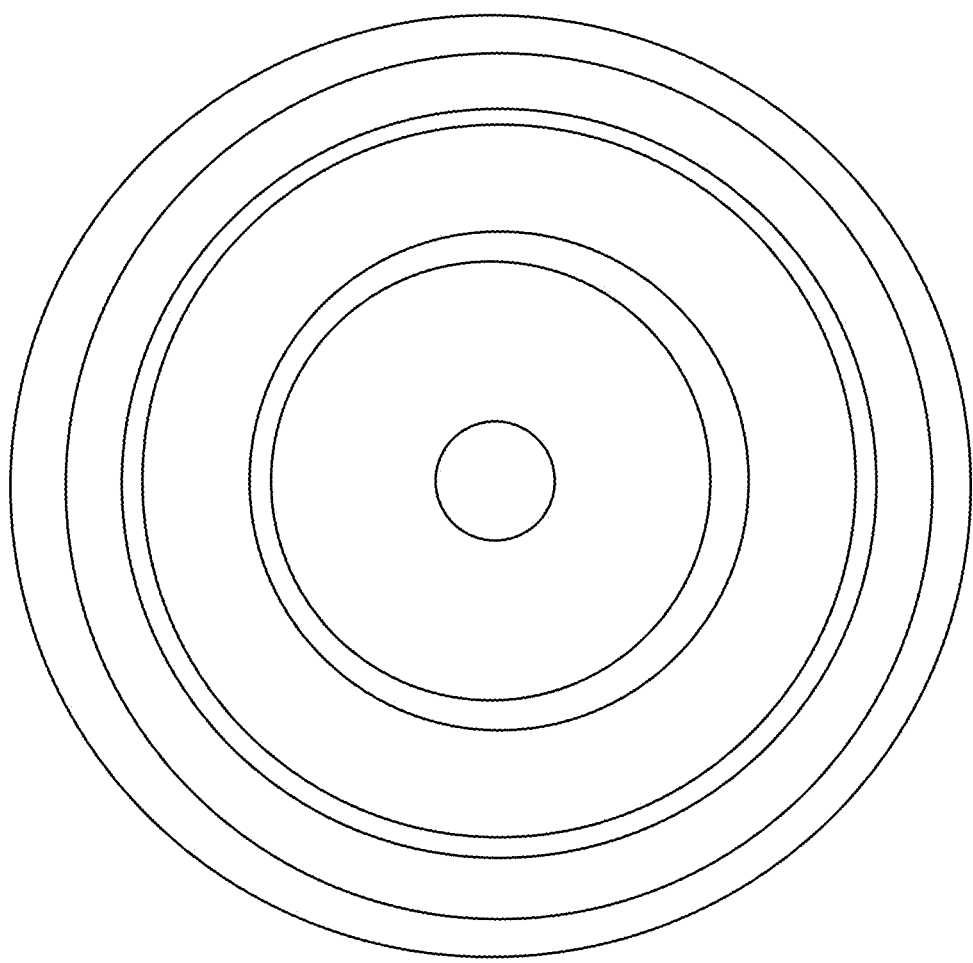
FIG. 2A is a photographs of a sand mold usable to form a brake rotor according to an embodiment of the present disclosure.
Figure 2B:
FIG. 2B is a photograph of two aluminum casts of the brake rotor formed using the sand mold of FIG. 2A.

The cured cope and drag mold parts were then removed from the autoclave and assembled into the full brake rotor mold shown in FIG. 2A. 4.5 kg of A356.2 alloy was melted in a clay-bonded graphite pot in a furnace that was heated to 750° C. for 1 hour. The pot containing the melt was removed from the furnace. The melt was skimmed to remove dross and then poured into the mold through a filter. After 1 hour, the solidified metal was shaken out of the mold by breaking up the mold material. Excess metal from the mold gating was removed from the cast piece. The resulting brake rotor with visible fine details and high-quality surface finish was shown in the photograph of FIG. 2B.

Example 3: Magnesium Aluminum Phosphate Bonded Sand Core Material 3500 g of silica sand (Wedron 410 grade) was mixed with 35 g of magnesium oxide powder ($d_{50}$=~3 μm) and 105 g of ball clay using a stand mixer. Once this mixture was sufficiently homogeneous, 105 g of an aqueous solution containing 40 wt % $Al(H_2PO_4)_3$, 30 wt % $H_3PO_4$, and 30 wt % water was added and mixing is continued for 1.5 minutes. The final mixture was shaped into 12 dog bone-shaped samples along with a single disc sample and a 500 mL cup shape. The samples were tested for work time, stripped, and then tested for tensile strength at various time intervals under different humidity conditions.

Example 4: Magnesium Aluminum Iron Phosphate Bonded Sand Core Material 2200 g of silica sand (Wedron 410 grade) was mixed with 77 g of an aqueous solution containing 45 wt % $Al(H_2PO_4)_3$, 23 wt % $H_3PO_4$, and 32 wt % water. Once this mixture was sufficiently homogeneous, 30 g of powder consisting of 90 wt % MgO and 10 wt % $Fe_2O_3$ was added and mixing was continued for 1.5 minutes. Prior to addition to the mixture, the MgO and $Fe_2O_3$ precursors were fired to 1300° C., and the resulting aggregate is pulverized and sieved to −325 mesh. The final mixture was shaped into 15 dog bone-shaped samples along with a single disc sample. The samples were tested for work time, stripped, and then tested for tensile strength at various time intervals under different humidity conditions. The typical properties of these samples were summarized in the following Table 1.

TABLE 1

| | Time (min) |
|---|---|
| Work Time | 6 |
| Strip Time | 10 |

| | Tensile Strength (psi) |
|---|---|
| 1 hour | 125 |
| 3 hours | 150 |
| 24 hours (dry) | 180 |
| 24 hours (humid) | 126 |

Example 5: Strontium Titanate Bonded Sand Core 101 g of KOH was dissolved into 6 kg of deionized water by manually stirring for 5 minutes. This solution was sparged with flowing $N_2$ gas for 12 h, in order to remove dissolved $CO_2$. 783 g of $Sr(OH)_2 \cdot 8H_2O$ was then stirred into the solution magnetically for 20 min. Separately, 87 g of synthetic olivine sand (AFS GFN 70) was mixed with 10 g of 3 mol % yttria-stabilized zirconia powder and 3 g of deionized water. The sand mixture was compacted into a borosilicate glass tube with 37 mm length and diameter. The tube containing the compacted sand mixture was sealed inside a cylindrical stainless steel enclosure (50 mm diameter×100 mm length) that served as a core box and was designed to allow heating as well as high-pressure flow of liquid through it. The enclosure was heated to 200° C. and the KOH/Sr(OH)$_2$ solution was pumped through the enclosure at 80 psig for 1 hour. The cylinder was then removed from the core box and dried at 100° C. in a convection oven to remove residual water.

Afterward, the cylinder was subjected to hot compressive strength and penetration tests to demonstrate that it had sufficient refractory and mechanical properties for casting applications. In the alternative, Ba(OH)$_2$ was substituted for some or all of the Sr(OH)$_2$, and TiO$_2$ was be substituted for some or all of the ZrO$_2$, in order to reduce the curing temperature.

Example 6: Calcium Silicate-Carbonate Bonded Investment Casting Molds 11 g of Darvan 811 dispersant (sodium polyacrylate solution) and 15 g of potassium chloride was dissolved into 2 kg of deionized water under stirring. The resulting mixture was heated to 80° C., during which 20 g of kappa carrageenan was dissolved into the mixture under stirring. Once a clear light-yellow mixture is achieved, 3.8 kg of pre-heated calcium silicate (CaSiO$_3$) powder (NYAD 400) is added to the heated mixture, while mixing using a blade mixer rotating at 2500 rpm to form a thermoreversible slurry containing CaSiO$_3$. Once the thermoreversible slurry is satisfactorily homogeneous, it was placed in an appropriate heated container for the dipping process. In this example, no refractory sand or stucco was included in the slurry, and the only particulate refractory material is the CaSiO$_3$. A sprue-mounted beeswax owl figurine, which was used as a casting pattern, was washed with a dilute citrus-based wax-cleaning solution, rinsed, and dried. The slurry was maintained at a temperature of 70° C., and the pattern was then dipped into the slurry for 3 seconds and then withdrawn. The coated pattern was held for 1 minute, and then dipped again for 3 seconds. This cycle was repeated a total of 5 times. After each dipping step, the slurry cooled to a temperature of about 50° C. or less and forms a thermoreversible gel on the casting pattern.

The fully coated casting pattern (i.e., the casting pattern coated with a completed thermoreversible gel coating formed by the dipping steps) was hung in a 230 L autoclave and cured with CO$_2$ to form an investment casting mold (e.g., shell) on the casting pattern. In particular, the autoclave was sealed, heated to 40° C., and filled with bone-dry CO$_2$ until a pressure of 60 psig was achieved. The autoclave was held at these conditions for 20 hours with a lid-mounted fan continuously rotating at 500 RPM. After 20 hours had elapsed, the autoclave was allowed to cool, the pressure was released, and the fan was turned off.

Figure 3:
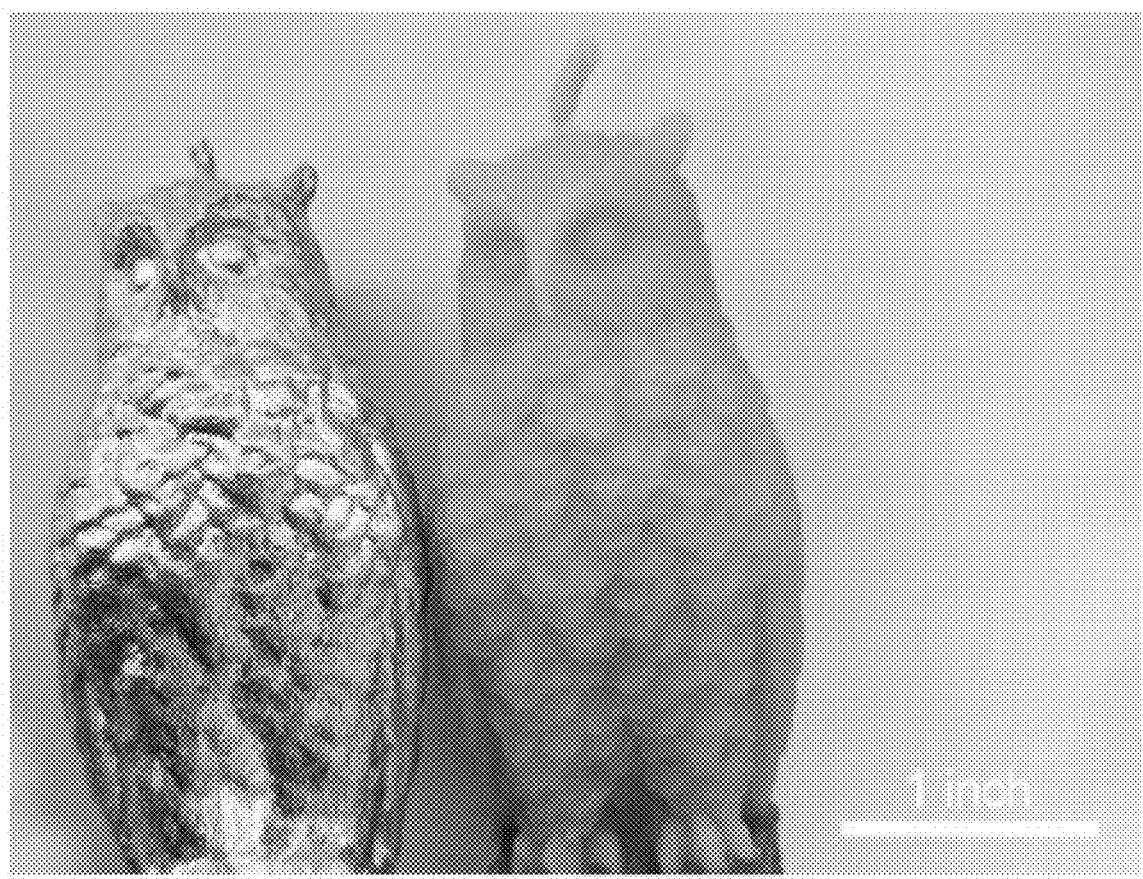
FIG. 3 is a photograph including a wax pattern and an aluminum cast formed using the wax pattern.

The cured mold was then removed from the autoclave, and the pattern material was removed by hanging the assembly upside down in a convection oven held at 150° C., resulting in a mostly "dewaxed" mold. The mold was subsequently heated to 450° C. for 2 hours to remove residual wax and preheat the mold, while 300 g of A356.2 alloy was melted in a clay-bonded graphite pot in a furnace that is heated to 750° C. for 1 hour. The hot mold and pot containing the melt were removed from their respective furnaces. The melt was skimmed to remove dross and then poured into the mold. After 1 hour, the solidified metal was shaken out of the mold by breaking up the mold material. FIG. 3 was a photograph showing the resulting A356.2 alloy owl 10 with visible fine details and high-quality surface finish and an example of the wax pattern 12.

Example 7: Calcium Silicate-Carbonate Bonded Investment Shells for Casting of High Melting Temperature Metals and Alloys 140 g of a colloidal silica suspension (Nalco 1030) was diluted with 300 g of deionized water. The resulting diluted colloidal silica suspension underwent magnetic stirring for 10 min at a speed of 200 rpm. Next, 50 g of a polymer suspension (Nalco ESP 6305) was mixed with the diluted colloidal silica suspension, and the resulting suspension was magnetically stirred for another 30 min at 200 rpm. After that, 2600 g of −200 mesh zircon flour (ZrSiO$_4$) was gradually added to the suspension while stirring to form a zircon slurry. Once the zircon slurry was free of visible powder agglomerates, stirring was continued with an overhead stirrer for 2-3 hours at low speed to remove any trapped bubbles.

A clean wax pattern was slowly dipped into the zircon slurry over a 60 second period and held for 3-5 s thereafter, after which the pattern was removed from the slurry, tilted, and rotated to drain excess slurry. The coated pattern was then stuccoed with zircon flour and dried at ambient conditions for 15 min. The wax pattern was once again slowly dipped into the zircon slurry over a 60 second period and held for 3-5 seconds, and thereafter, removed, drained of slurry, stuccoed, and dried for 30 minutes. While drying the coated zircon slurry, the colloidal silica and the polymer formed a gel.

The coated and dried pattern was then dip coated with the thermoreversible slurry of Example 5. The fully coated pattern was then hung in a 230 L autoclave. The autoclave was sealed, heated to 40° C., and filled with bone-dry CO$_2$ until a pressure of 60 psig was achieved. The autoclave was held at these conditions for 20 hours with a lid-mounted fan continuously rotating at 500 RPM. After 20 hours had elapsed, the autoclave was allowed to cool, the pressure is released, and the fan is turned off.

For the following examples, processing details were provided for raw materials mixing and/or the corresponding thermoreversible slurry preparation for each investment casting mold or shell forming protocol. The other processing steps such as primary slurry preparation, dip coating, and LTS processes that enable forming molds/shells were the same as that described in Example 6.

Example 8: Mixture of Calcium Silicate and Aluminosilicate 2 kg of calcium silicate powder and 2 kg g of aluminosilicate powders (Mullite) (Mulcoa 60) were manually mixed for 30 minutes, after which they were preheated in a convective oven at 85° C. for at least 12 h. This 4 kg mixture was substituted for 3.8 kg of calcium silicate in the thermoreversible slurry formulation described in Example 6, which was then cured as described in Example 6. The aluminosilicate powder may operate as a non-reactive filler in this example.

Example 9: Mixture of Calcium Silicate, Fused Silica and Calcium Carbonate 1494 g of calcium silicate powder, 2490 g of fused silica flour (Ranco-Sil-200 mesh), and 996 g of calcium carbonate powder were mixed and heated in the same manner as in Example 8. This 3.635 kg mixture was substituted for 3.8 kg of calcium silicate in the thermoreversible slurry formulation described in Example 6, which was then cured as described in Example 6. The calcium carbonate may operate as a sintering aid that strengthens the mold material if the mold material is fired.

Example 10: Thermoreversible Slurry with Incorporated Colloidal Silica Binder 7.5 g of potassium chloride (KCl) is added to 1 L of deionized water. The resulting KCl solution underwent magnetic stirring for 10 min at a speed of 200 rpm. Next, 5.5 g of sodium polyacrylate dispersant (Darvan 811) was mixed with the KCl solution, and stirring was continued for 30 minutes. Subsequently, 90 g of colloidal silica suspension (Nalco 1030) was added, and the resulting suspension was stirred for another 10 min at 300 rpm. Finally, 20 g of kappa carrageenan was added to the suspension and the resulting thermoreversible suspension was heated to 85° C. and stirred at a speed of 550 rpm over the course of 1 hour.

Separately, 346 g of calcium silicate powder and 1959 g of fused silica flour were mixed and heated in the same manner as in Example 8. The suspension and powder mixture were combined to create a thermoreversible slurry as described in Example 6, which was then cured as described in Example 6.

Example 11: Thermoreversible Slurry Containing Magnesium Oxide

Pure magnesium oxide powder was fired in a muffle furnace at 1500° C. for 3 h. The resulting dead-burned magnesium oxide powder aggregate (MgO) was then crushed, ground and sieved to −170 mesh. 319 g of calcium silicate powder, 1716 g of fused silica flour, and 150 g of sieved dead-burned magnesium oxide powder were mixed and heated as described in Example 8. A thermoreversible suspension was created as described in Example 10, and the suspension and 2.185 kg powder mixture were combined to make a thermoreversible slurry as described in Example 6, which is then cured as described in Example 6.

Example 12: Thermoreversible Slurry Containing Calcium Oxide

Calcium carbonate powder was fired in a muffle furnace at 1300° C. for 3 h. The resulting dead-burned calcium oxide powder aggregate was then crushed, ground and sieved to −170 mesh. 296 g of calcium silicate powder, 1485 g of fused silica flour, and 198 g of sieved dead-burned calcium oxide powder were mixed and heated as described in Example 8. A thermoreversible suspension was created as described in Example 10, and the suspension and the 1.979 kg powder mixture were combined to make a thermoreversible slurry as described in Example 6, which was then cured as described in Example 6.

Example 13: Thermoreversible Slurry Containing Fused and Colloidal Silicas

A thermoreversible suspension containing colloidal silica was prepared as described in Example 9, except 160 g of colloidal silica was used instead of 90 g, and 20 g of carrageenan was used instead of 40 g. Once the suspension was homogeneous and heated to 85° C., it was immediately agitated by a blade mixer at 2000 rpm. Then, 2200 g of fused silica flour that had been preheated to 85° C. for 12 h was slowly added to the agitated solution. When fused silica powders were fully added, the mixing was continued for another 1-2 min until the slurry was free of any visible powder agglomerates. The homogeneous slurry was poured into a pre-heated plastic container (Bel-Art Products, Wayne, NJ), sealed, and stored in a convective oven at 85° C. for later use.

Example 14: Refractory Matrix Sample Containing Fused Magnesia 80 g of fused magnesium oxide powder (−325 mesh), 20 g of graphite powder (−100 mesh), and 4 g of water were mixed in an intensive mixer for 5 minutes. Once the mixture was sufficiently homogeneous, it was shaped into a disc shaped sample (5 cm diameter by 2 cm thickness) using a hydraulic press with a pressure of ~18 ksi. The sample was then placed in a 4 L autoclave. The autoclave was sealed, heated to 60° C., and filled with bone-dry $CO_2$ until a pressure of 120 psig was achieved. The autoclave was held at these conditions for 20 hours, after which the autoclave was allowed to cool and the pressure was released. The bricks were then dried at 125° C. overnight and tested for various physical properties.

Example R2: Refractory Matrix Sample Containing Dead-Burned Magnesia 80 g of dead burned MgO ($d_{50}$=3 μm), 20 g of carbon black granules, and 4 g of water were mixed in an intensive mixer for 5 minutes. It was then shaped into a disc sample, after which the sample was cured and tested as described in Example R1.

Example R3: Refractory Matrix Sample Containing Mixed Carbon 80 g of fused MgO (−325 mesh), 10 g of graphite powder (−100 mesh), 10 g of carbon black granules, and 4 g of water were mixed in an intensive mixer for 10 minutes. It is then shaped into a disc sample, after which the sample was cured and tested as described in Example R1.

Example R4: Refractory Matrix Sample Containing Mixed Magnesia and Carbon 40 g of fused MgO (−325 mesh), 40 g of dead burned MgO ($d_{50}$=3 μm), 14 g of graphite powder (−100 mesh), 4 g of carbon black granules, 2 g of graphene nanopowder, and 4 g of water were mixed in an intensive mixer for 15 minutes. It was then shaped into a disc sample, after which the sample was cured and tested as described in Example R1.

Example R5: Refractory Brick Manufacture 16.4 kg of fused magnesium oxide aggregate, 3.2 kg of graphite powder, and 0.4 kg of water were mixed in an intensive mixer for 10 minutes. The solids in the resulting mixture had a wide particle size range (e.g. 0.001-4 mm). Once the mixture was sufficiently homogeneous, it was shaped into 5 refractory bricks using a hydraulic press with a pressure of ~18 ksi. The bricks were then placed in a 230 L autoclave. The autoclave was sealed, heated to 60° C., and filled with bone-dry $CO_2$ until a pressure of 60 psig was achieved. The autoclave was held at these conditions for 20 hours with a lid-mounted fan continuously rotating at 500 RPM. After 20 hours had elapsed, the autoclave was allowed to cool, the pressure was released, and the fan was turned off. The bricks were then dried at 125° C. overnight and tested for various physical properties.

The preceding description of the disclosed aspects is provided to enable any person skilled in the art to make or use the present invention. Various modifications to these aspects will be readily apparent to those skilled in the art, and the generic principles defined herein may be applied to other aspects without departing from the scope of the invention. Thus, the present invention is not intended to be limited to the aspects shown herein but is to be accorded the widest scope consistent with the principles and novel features disclosed herein.

What is claimed is:

1. A method of forming a foundry casting element, the method comprising:
    forming an aqueous slurry comprising a solid inorganic binder material or a precursor thereof;
    packing the slurry against a pattern to form a shaped slurry;
    curing the shaped slurry at a temperature of less than 350° C. to form a casting element;
    removing the pattern from the casting element,
    wherein the solid inorganic binder material comprises at least one component selected from the group consisting of magnesium oxide, magnesium hydroxide, magnesium carbonate, magnesium carbonate hydrate, calcium oxide, calcium hydroxide, calcium carbonate, mono-calcium silicate, di-calcium silicate, tri-calcium silicate, calcium aluminate, calcium aluminosilicate, and a rare earth oxide,
    wherein the curing comprises infiltrating the shaped slurry with $CO_2$ at a temperature ranging from about 15° C. to about 350° C. and at a pressure ranging from about 0.5 psig to about 5,000 psig, and
    wherein the slurry optionally comprises an inert component selected from the group consisting of oxide sands, diamond, graphite, carbon black, graphene, graphene oxide, metal carbides, silicon carbide, boron carbide, tungsten carbide, niobium carbide, titanium boride, zirconium boride, zirconia, titania, alumina, olivine, diopside, garnet, spinel, quartz, cristobalite, tridymite, calcium carbonate and dolomite, wherein the inert component does not react with the binder material or the precursor thereof.

2. The method of claim 1, wherein the curing occurs only after the slurry is shaped.

3. The method of claim 1, wherein:
    the at least one component is combined with one or more of clay, colloidal silica, and one or more elements selected from the group consisting of magnesium, aluminum, iron, zinc, zirconium, titanium, vanadium, yttrium, lithium, sodium, potassium, bismuth, cerium, strontium, calcium, barium, lanthanum, copper, and boron, wherein the one or more elements are in a form of oxide, hydroxide and/or hydrous oxide; and
    the slurry further comprises $H_3PO_4$ and a refractory sand.

4. The method of claim 1, wherein:
    the at least one component is combined with one or more of clay, colloidal silica, and one or more elements selected from the group consisting of magnesium, aluminum, iron, zinc, zirconium, titanium, vanadium, yttrium, lithium, sodium, potassium, bismuth, cerium, strontium, calcium, barium, lanthanum, copper, and boron, wherein the one or more elements are in a form of oxide, hydroxide and/or hydrous oxide.

5. A method of forming a foundry casting element, the method comprising: forming an aqueous first slurry comprising a refractory sand, colloidal silica and a binding polymer;
    forming an aqueous second slurry comprising a solid inorganic binder material and a thermoreversible additive;
    applying the first slurry to a pattern to form a first coating;
    heating the second slurry to a temperature ranging from about 40° C. to about 250° C.;
    dipping the pattern into the heated second slurry to form a second coating on the first coating;
    gelating the second coating by allowing the second coating to cool to a temperature below about 40° C.; and
    infiltrating the first coating and the second coating with $CO_2$ to cure the first coating and the second coating to form a casting element with two coating layers;
    wherein the first slurry and/or second slurry optionally comprises an inert component selected from the group consisting of oxide sands, diamond, graphite, carbon black, graphene, graphene oxide, metal carbides, silicon carbide, boron carbide, tungsten carbide, niobium carbide, titanium boride, zirconium boride, zirconia, titania, alumina, olivine, diopside, garnet, spinel, quartz, cristobalite, tridymite, calcium carbonate and dolomite, wherein the inert component does not react with the binder material or the binding polymer.

6. The method of claim 5, wherein the dipping and the gelating are performed at least twice to form a three-layer structure.

7. The method of claim 5, wherein the refractory sand comprises a zircon sand;
    wherein the method further comprises applying additional zircon sand to the first coating; and
    the solid inorganic binder material comprises at least one component selected from the group consisting of magnesium oxide, magnesium hydroxide, calcium oxide, calcium hydroxide, mono-calcium silicate, di-calcium silicate, tri-calcium silicate, calcium aluminate, calcium aluminosilicate, and a rare earth oxide.

8. A method of forming a foundry casting element, the method comprising:
    forming an aqueous slurry comprising a solid inorganic oxide material; and
    infiltrating the slurry with $CO_2$ to at least partially convert the solid inorganic oxide material to a solid inorganic carbonate material and to form a refractory element for bricks, or castable, gunning, or ramming mixes;
    wherein the foundry casting element optionally comprises an inert component selected from the group consisting of oxide sands, diamond, graphite, carbon black, graphene, graphene oxide, metal carbides, silicon carbide, boron carbide, tungsten carbide, niobium carbide, titanium boride, zirconium boride, zirconia, titania, alumina, olivine, diopside, garnet, spinel, quartz, cristobalite, tridymite, calcium carbonate and dolomite, wherein the inert component does not react with the inorganic oxide material,
    wherein the $CO_2$ is infiltrated at a temperature ranging from about 15° C. to about 350° C. and at a pressure ranging from about 0.5 psig to about 5,000 psig.

9. The method of claim 8, wherein the solid inorganic oxide material comprises $CaSiO_3$, and the infiltrating the slurry with $CO_2$ at least partially converts the $CaSiO_3$ to a calcium carbonate in a sand mold foundry casting element.

10. The method of claim 8, wherein:
    the solid inorganic oxide material comprises MgO; and
    infiltrating the shaped slurry with $CO_2$ partially converts the MgO to magnesium carbonate to form a refractory element for bricks, or castable, gunning or ramming mixes;
    wherein the MgO particles are bonded to each other by magnesium carbonate particles, wherein the MgO particles are larger than the magnesium carbonate particles.

11. The method of claim 8, wherein the slurry comprises the inert component and the resulting refractory element for bricks, or castable, gunning, or ramming mixes is admixed with the inert component.

12. The method of claim 8, wherein the slurry comprises a silica sand, an olivine sand, a chromate sand, a zircon sand, a chamotte sand, aluminosilicate sand, or any combinations thereof.

\* \* \* \* \*